Patented Aug. 24, 1943

2,327,964

UNITED STATES PATENT OFFICE 2,327,964

NITRATION OF ALKANES

Edward B. Hodge, Terre Haute, Ind., assignor to Commercial Solvents Corporation, Terre Haute, Ind., a corporation of Maryland No Drawing. Application August 2, 1940,
Serial No. 350,153

2 Claims. (Cl. 260—644)

My invention relates to the nitration of alkanes, and more specifically to an improved method of controlling the reaction in the direct vapor phase nitration of alkanes.

The direct vapor phase nitration of alkanes is disclosed in U. S. Pat. 1,967,667 of H. B. Hass et al., U. S. Pat. 2,071,122 of H. B. Hass et al., U. S. Pat. 2,161,475 of G. K. Landon, U. S. Pat. 2,164,774 of G. K. Landon, and U. S. Pat. 2,206,813 of H. B. Hass et al. In this process an alkane and nitric acid, or nitrogen dioxide, are reacted in the vapor phase to produce nitro-alkanes. While satisfactory yields and conversions are obtainable by this process, the over-all yields and conversions obtained in a continuous process, have not equaled the high instantaneous yields and conversions which are often secured.

I have found that the reason for this failure to obtain uniform results in carrying out this reaction, is the inadequacy of ordinary control measures. If the reaction appears to be operating at optimum efficiency with any particular combination of reaction conditions (temperature, contact time, pressure, and composition of reaction mixture), careful maintenance of these reaction conditions will not result in uniform operation. I have now found, however, that substantially uniform operation can be secured if the time-temperature factor, (i. e., contact time and/or temperature or in other words, the quantum of heat input), is regulated so as to maintain the acidity of the reaction products within a relatively narrow range.

Since water is one of the reaction products of the nitration reaction, and the nitroalkanes are in all cases at least partially immiscible with water, the liquid reaction products separate into two layers. The titratable acidity of the aqueous layer constitutes a convenient measure of acidity of the reaction products, and this value may be used as the basis for the control of the time-temperature factor in accordance with my present invention.

In the vapor phase nitration of alkanes, as in other vapor phase reactions, the contact time and reaction temperature are interrelated so that increased reaction is obtainable by increasing either or both of these factors. It is to be understood, therefore, that when the phrase "regulating the time-temperature factor" is used herein, it is meant to signify regulation of the contact time, and/or the reaction temperature.

If the acidity of the aqueous layer of the reaction products rises above the desired operating range, the reaction temperature should be increased, or the contact time increased (space velocity decreased), or both of these changes may be made simultaneously. Similarly, if the acidity of the aqueous layer drops below the desired operating range, the reaction temperature should be decreased, or the contact time should be decreased (space velocity increased), or both of these changes may be made simultaneously. Since it is usually desirable to operate at constant space velocity, it is most convenient merely to adjust the reaction temperature in accordance with the acidity of the aqueous layer. Very small adjustments in temperature will cause relatively large fluctuations of the acidity, and the temperature adjustment should, therefore, be made gradually. A temperature change of 5° C. is usually sufficient to produce an acidity outside of the desired operating range, and thus result in lowered yield and conversion.

I have found that for the nitration of any of the alkanes, the acidity of the aqueous layer of the product (expressed in normality), should be maintained within the range 0.1 N to 1.5 N. The optimum value within this range, in any given case, will depend upon the particular alkane being nitrated, and on the composition of the reaction mixture. The optimum acidity decreases with increasing water content of the reaction mixture. Thus, if nitric acid is used as the nitrating agent, the optimum operating acidity will be lower when dilute acid is used, than when concentrated acid is used.

My invention is particularly applicable to the nitration of alkanes containing from two to four carbon atoms. When nitrating these alkanes, using nitric acid as the nitrating agent, the acidity of the aqueous layer of the products is suitably maintained within the range 0.1–0.6 N. If the reaction mixture consists solely of alkane and concentrated nitric acid, the acidity is preferably maintained in the upper portion of this range. With additional water present in the reaction mixture, the acidity is preferably maintained in the lower part of this range. When nitrating methane the acidity of the aqueous layer of the products is maintained at a higher value than required for the nitration of other alkanes. I prefer to maintain the acidity at 0.7–1.0 N. when nitrating methane with concentrated nitric acid. Somewhat lower acidity is preferable if more water is present in the reaction mixture.

A determination of yield and conversion when operating at substantially constant acidity, for different acidity values within the operating ranges specified above, will, of course, constitute the best method for determining the optimum value in any given case. It is generally desirable to attempt to maintain the acidity within 0.1 N above or below the value thus determined.

Except for the improved method of controlling the reaction described above, the nitration may be effected in accordance with prior practices. The usual ratios of reactants may be employed, and the reaction may be carried out under various conditions of pressure, temperature, and space velocity known to be suitable for any particular reaction mixture. The initial values of temperature and space velocity thus chosen, however, will be modified as required by the acidity, when carrying out my process.

My invention may be further illustrated by the following specific examples:

Example I

Nitric acid was vaporized and mixed with propane to form a mixture of nitric acid vapor, propane and water vapor, in molar ratios of approximately 1.0 to 5.0 to 2.7. This mixture was passed through a heated reaction tube at a gauge pressure of 80 lbs. per sq. in., and a space velocity of approximately 5000 liters of gas, calculated at 0° C. and 760 mm., per liter of reaction space, per hour. The reaction chamber was surrounded by a bath of molten salt and the temperature of the salt bath was adjusted in accordance with the acidity of the aqueous layer of the reaction products. Minor adjustments in temperature within the range 386–391° C. were necessary to maintain the acidity within the range 0.3–0.5 N. When the acidity was maintained in this range the conversion of nitric acid to nitroparaffins was approximately 40 per cent.

Example II

Nitric acid vapor, propane, and water vapor were passed through a heated reaction tube in molar ratios of approximately 1.0 to 4.8 to 7.6, at a space velocity of 19 thousand and a gauge pressure of 125 lbs. per sq. in. In this case temperature adjustments in the range 400–403° C. were found to be necessary to maintain the acidity in the range 0.1 to 0.3 N. When the acidity was maintained in this range the conversion of nitric acid to nitroparaffins was approximately 40 per cent.

Example III

Nitric acid vapor, butane, and water vapor were passed through a heated reaction tube in molar ratios of approximately 1.0 to 4.7 to 2.1, at a space velocity of approximately 25 thousand and a gauge pressure of 15 lbs. per sq. in. In this case temperature adjustments in the range 498–503° C. were found to be necessary to maintain the acidity in the range 0.4–0.6 N. When the acidity was maintained in this range, the conversion of butane to nitroparaffins was approximately 44 per cent.

Example IV

Nitric acid vapor, methane, and water vapor in molar ratios of approximately 1.0 to 12.0 to 2.1 were passed through a heated reaction tube at a pressure of 80 lbs. per sq. in. (gauge), and a space velocity of 14 thousand. The temperature was regulated to maintain the acidity of the aqueous layer of the products within the range 0.7–1.0 N. The conversion of nitric acid to nitromethane was approximately 18 per cent.

It is to be understood, of course that the above examples are merely illustrative, and do not limit the scope of my invention. Various other combinations of reaction conditions may be employed, as long as the time-temperature factor is regulated in accordance with the acidity of the products. Any of the other alkanes may be nitrated, and nitrogen dioxide may be used in place of nitric acid, as illustrated in the examples. In general it may be said that the use of any equivalents or any modifications of procedure, which would occur to one skilled in the art, is included in the scope of my invention.

My invention now having been described, what I claim is:

1. A process for controlling the reaction in the production of nitro-alkanes which comprises continuously passing an alkane and nitric acid in the vapor stage through a heated reaction zone, condensing the reaction product to produce a layer of nitro-alkane and a layer of water, the latter containing unreacted nitric acid and controlling the reaction by continuously regulating, during the reaction, the quantity of heat input within a range that will maintain the acidity of the aqueous layer at a substantially constant value which is between 0.1 N to 1.5 N to secure substantially uniform operation.

2. A process for controlling the reaction in the production of nitro-alkanes which comprises continuously passing an alkane and nitric acid in the vapor stage through a heated reaction zone, condensing the reaction product to produce a layer of nitro-alkane and a layer of water, the latter containing unreacted nitric acid and controlling the reaction by continuously regulating, during the reaction, the quantity of heat input within a range that will maintain the acidity of the aqueous layer at a substantially constant value which is between 0.1 N to 1.5 N to secure substantially uniform operation by maintaining a substantially constant space velocity in the reaction zone and adjusting the reaction temperature.

EDWARD B. HODGE.